T. F. NEWMAN & O. W. JOHNSON.
STEVEDORE'S TRUCK.
APPLICATION FILED MAR. 23, 1917.
1,292,022.
Patented Jan. 21, 1919.
8 SHEETS—SHEET 1.
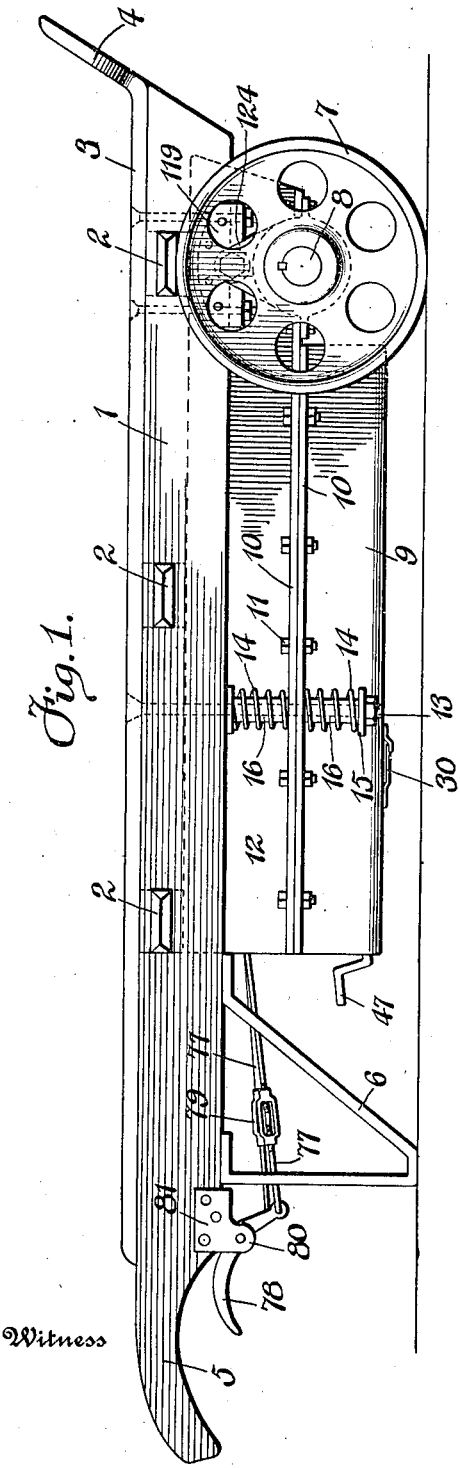
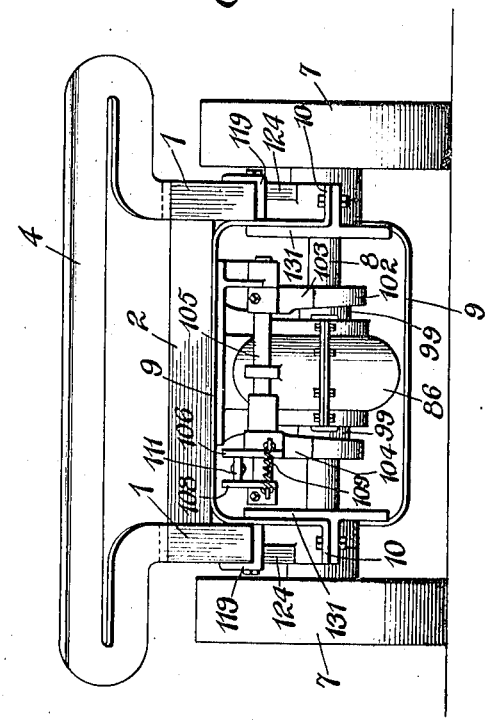
Witness
Inventors
Thomas F. Newman,
Oliver W. Johnson.
By
Attorneys

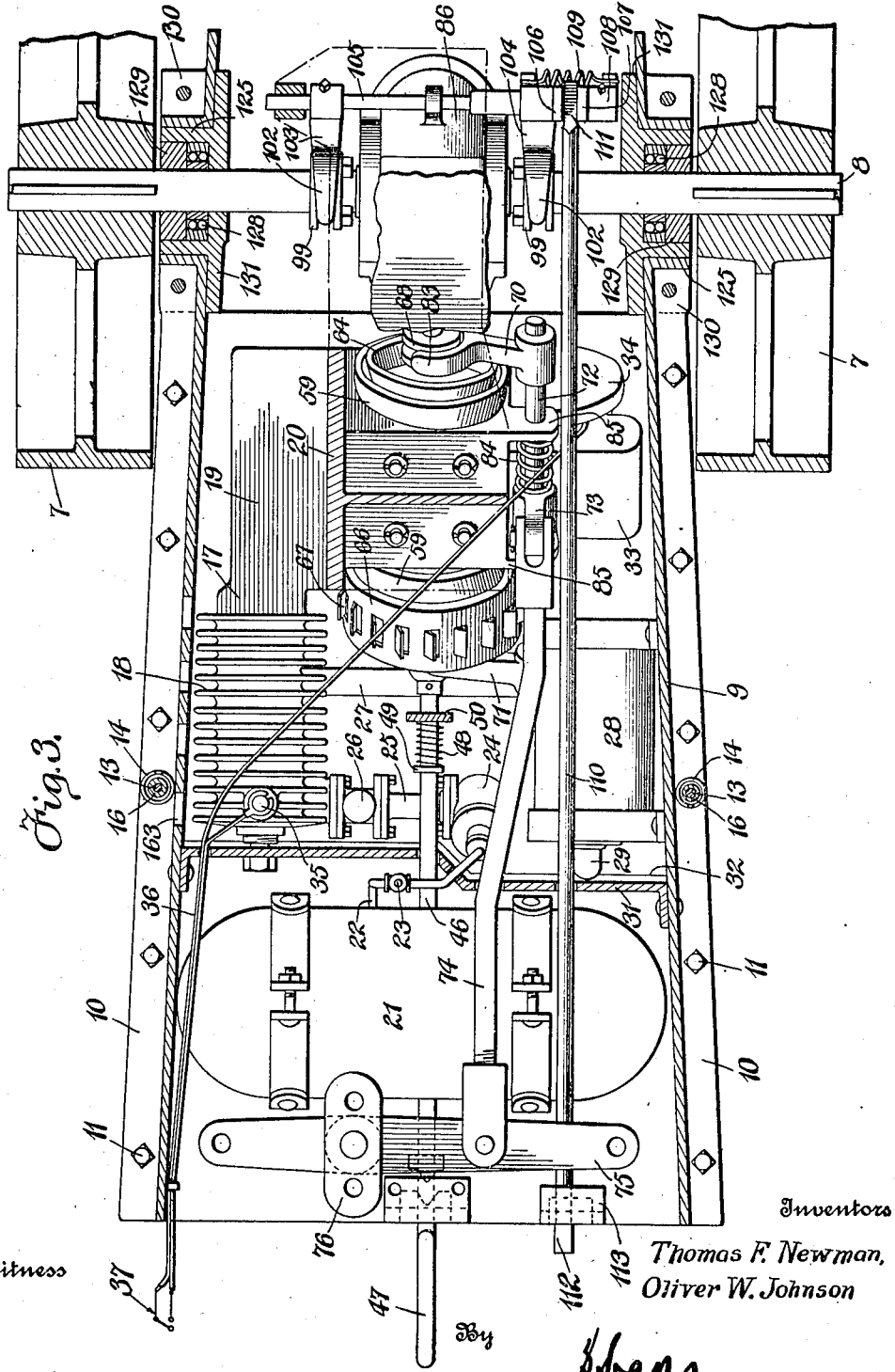

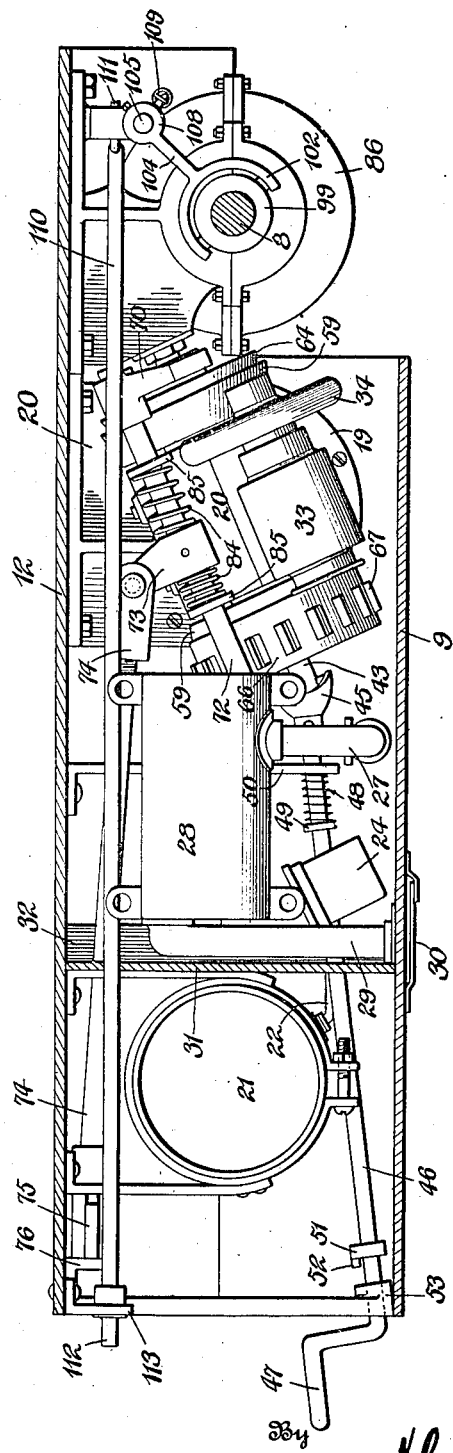

T. F. NEWMAN & O. W. JOHNSON.
STEVEDORE'S TRUCK.
APPLICATION FILED MAR. 23, 1917.

1,292,022.

Patented Jan. 21, 1919.
8 SHEETS—SHEET 4.

Inventor
Thomas F. Newman
Oliver W. Johnson

Witness

By
Attorneys.

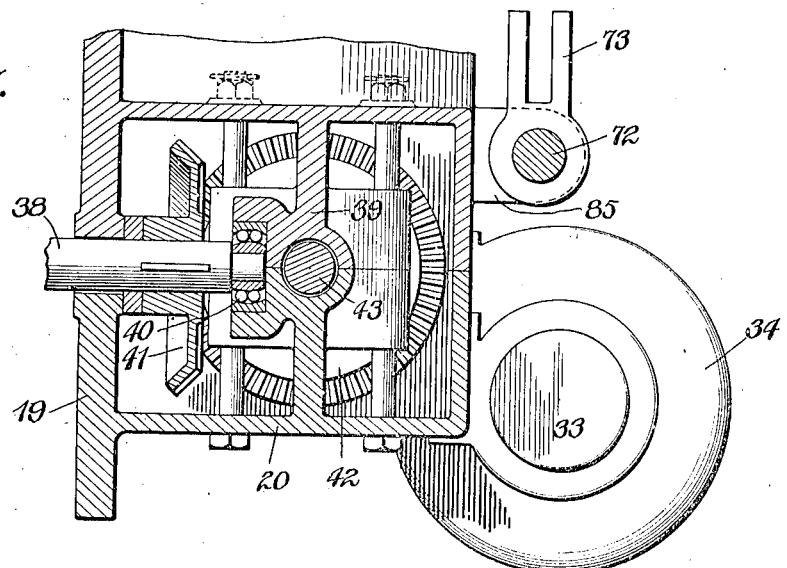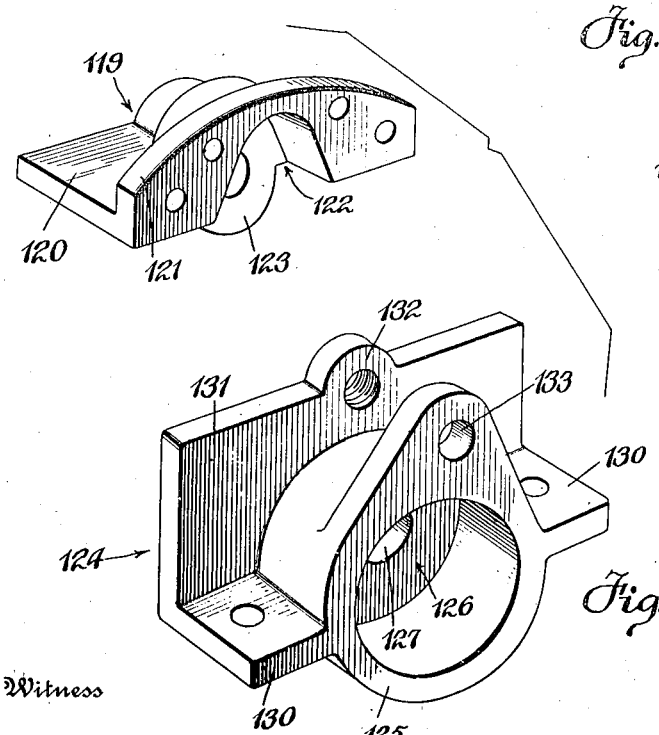

T. F. NEWMAN & O. W. JOHNSON.
STEVEDORE'S TRUCK.
APPLICATION FILED MAR. 23, 1917.

1,292,022.

Patented Jan. 21, 1919.
8 SHEETS—SHEET 6.

Inventors
Thomas F. Newman,
Oliver W. Johnson.

Witness

By

Attorneys.

T. F. NEWMAN & O. W. JOHNSON.
STEVEDORE'S TRUCK.
APPLICATION FILED MAR. 23, 1917.
1,292,022.
Patented Jan. 21, 1919.
8 SHEETS—SHEET 7.
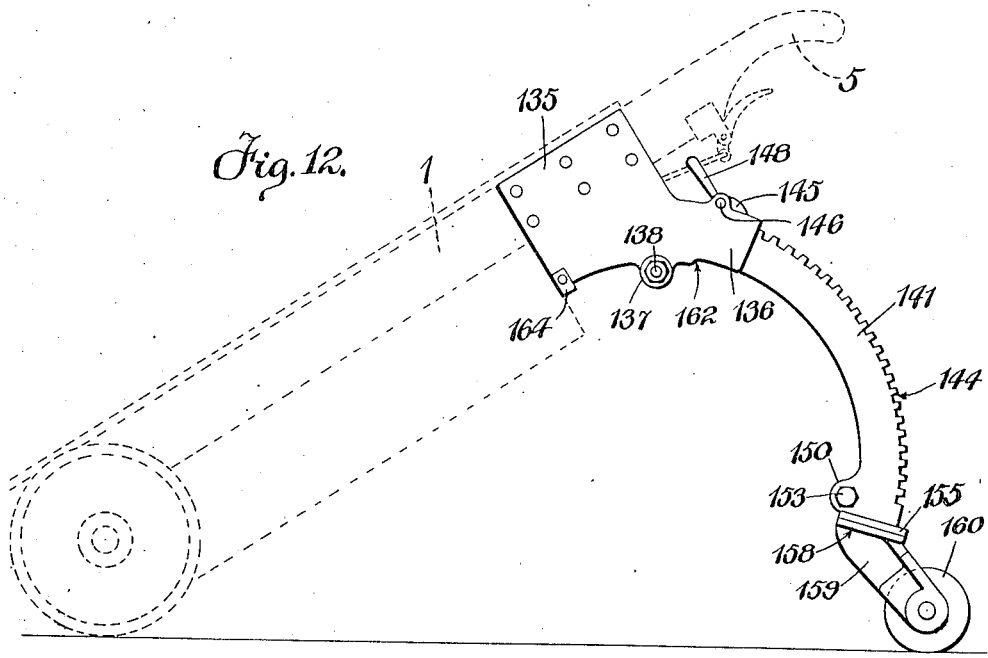
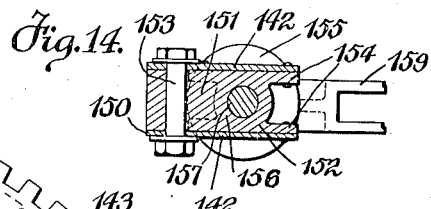
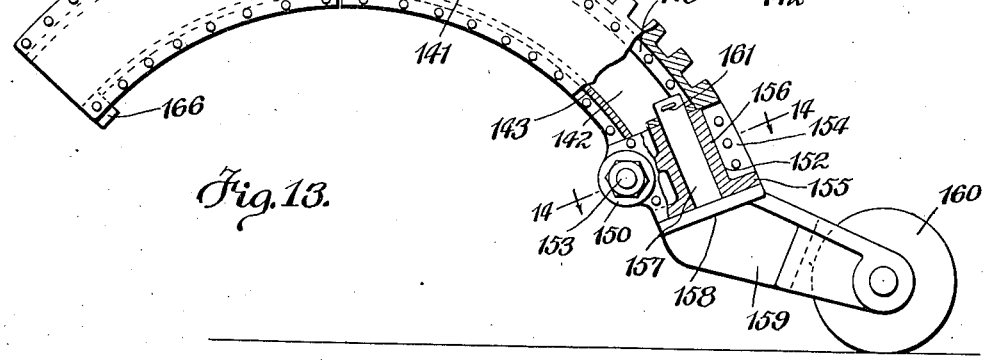
Inventors
Thomas F. Newman,
Oliver W. Johnson.
Witness
By
Attorneys.

T. F. NEWMAN & O. W. JOHNSON.
STEVEDORE'S TRUCK.
APPLICATION FILED MAR. 23, 1917.
1,292,022.
Patented Jan. 21, 1919.
8 SHEETS—SHEET 8.
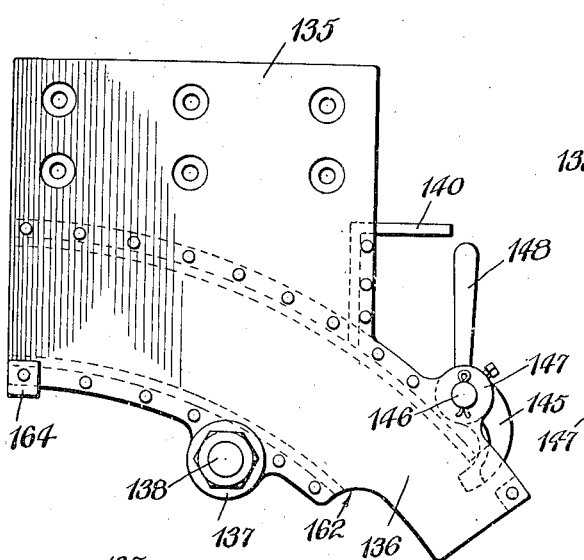
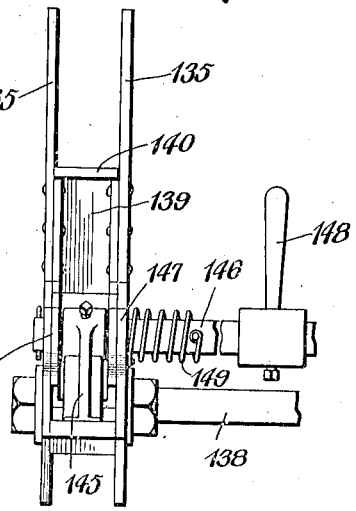
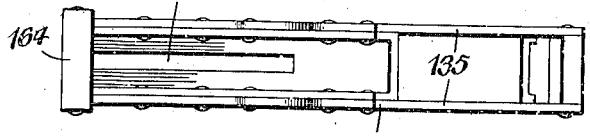
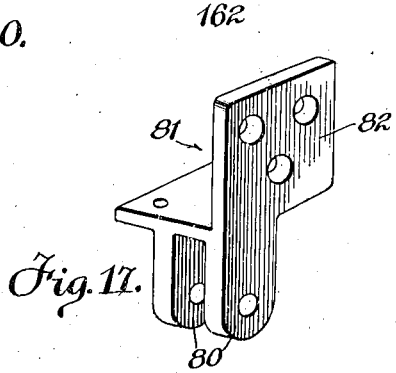
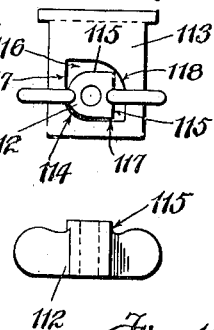
Inventors
Thomas F. Newman,
Oliver W. Johnson.
Witness
By
Attorneys.

UNITED STATES PATENT OFFICE.

THOMAS F. NEWMAN AND OLIVER W. JOHNSON, OF CLEVELAND, OHIO.

STEVEDORE'S TRUCK.

1,292,022.

Specification of Letters Patent.

Patented Jan. 21, 1919.

Application filed March 23, 1917. Serial No. 156,930.

*To all whom it may concern:*

Be it known that we, THOMAS F. NEWMAN and OLIVER W. JOHNSON, citizens of the United States, residing at Cleveland, in the county of Cuyahoga and State of Ohio, have invented certain new and useful Improvements in Stevedores' Trucks, of which the following is a specification.

This invention relates to trucks and has special reference to stevedores' trucks. The object of the invention is to provide means which may be readily applied to any stevedore's truck and by the use of which the labor of propelling the truck will be mechanically performed, the operator or stevedore being required merely to steer the truck and perhaps, in some forms, to balance the same. The invention also seeks to provide a power plant which may be readily applied to the back of a stevedore's truck and controlled from the handles thereof so that the truck may be moved forwardly or backwardly and instantly brought to rest if so desired. The invention also seeks to provide means for the stated purpose which will permit the truck to be propelled by hand in the usual manner if so desired. Other incidental objects of our invention will appear in the course of the following description, the invention residing in certain novel features which will be particularly pointed out in the claims following the description.

In the accompanying drawings:

Figure 1 is a side elevation of a truck showing one embodiment of our invention;

Fig. 2 is an end elevation of the same;

Fig. 3 is an enlarged plan view of the power plant with the frame of the truck removed and the wheels shown in horizontal section;

Fig. 4 is a side elevation of the power plant;

Fig. 7 is a transverse section on the line 7—7 of Fig. 5;

Fig. 10 is an enlarged detail section of the brackets which are used to connect the axle, with the truck wheels, to the frame of the truck;

Fig. 11 is a detail perspective view of said brackets separated but approximately in their proper relative positions;

Fig. 12 is a side elevation of an adjustable leg which may be attached to the truck at the handle end of the same;

Fig. 13 is a sectional elevation of one member of said leg on a larger scale;

Fig. 14 is a horizontal section taken on the line 14—14 of Fig. 13;

Fig. 15 is an enlarged side elevation of the housing or support for said adjustable leg;

Fig. 16 is an end elevation of the same;

Fig. 17 is a detail perspective view of the bracket by which the controlling rods or levers are supported upon the handles of the truck;

Figs. 18 and 19 are detail views of the handle end of a rock shaft which is employed to disconnect the axle of the truck from the power plant gearing.

Fig. 20 is a detail bottom plan view of the housing for the adjustable supporting leg.

Figure 5:
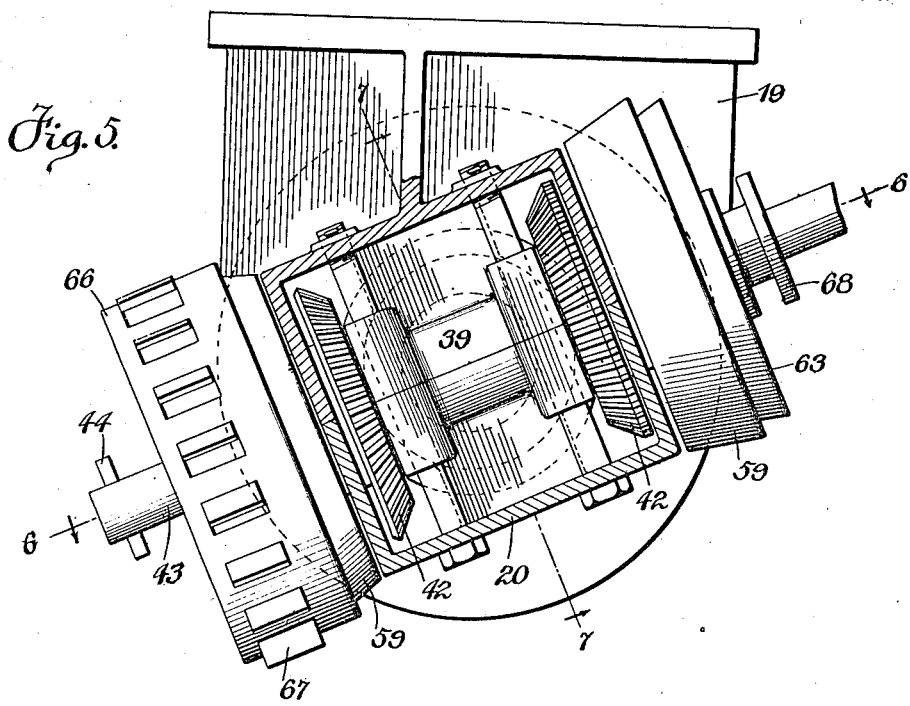
Fig. 5 is a sectional elevation of that portion of the operating gearing which connects the driving crank shaft with the transmission shaft.
Figure 6:
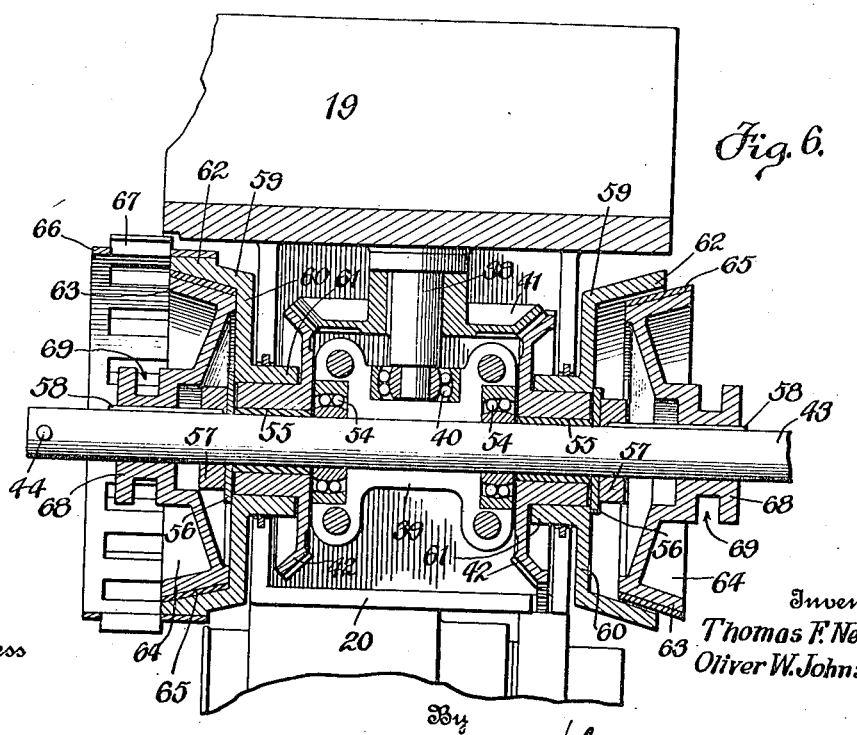
Fig. 6 is a horizontal section on the line 6—6 of Fig. 5.
Figure 8:
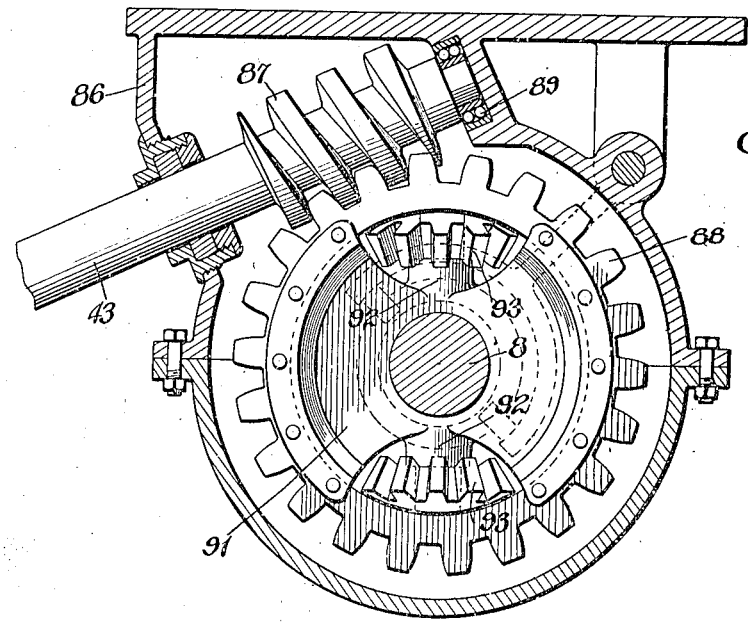
Fig. 8 is a side elevation of the differential gear, the gear case being shown in section.

The truck frame consists of the usual side bars 1 connected by cross bars 2 and having their front faces preferably reinforced by metallic facing plates or wear-strips 3, the lower ends of said facing plates or wear-strips being projected outwardly from the truck frame at an angle thereto to provide the usual chisel 4, as clearly shown in Figs. 1 and 2. At the ends remote from the chisel, the side bars 1 are formed into grips or handle members 5 and on their under or rear sides, adjacent the handle members, they may be equipped with the usual rigid legs 6, as shown in Fig. 1. The lower or forward end of the truck is supported by wheels 7 which may be of the usual dimensions and style and are keyed upon the ends of an axle 8 which is mounted in bearings upon the truck frame and is actuated by a power plant contained within a casing 9 mounted upon the rear or under side of the frame.

The said casing 9 is constructed in two sections and incloses all the gearing and the mechanism for driving the same, the sections being provided on their outer sides with flanges 10 through which securing bolts 11 are inserted to fasten the sections firmly together. The motor, the gear cases, the fuel tank and all the operating parts are supported from the upper member 12 of the casing and the casing is supported at its lower or forward end upon the axle while its upper or rear end is yieldably connected with the truck frame by shock absorbers, one of which is seen in Fig. 1. Each shock absorber consists of a long bolt or pin 13 inserted through the side bars of the truck and the flanges 10 and having springs 14 disposed around it between the truck frame and the flange 10 of the upper section of the casing 9 and between the flange 10 of the lower section of the casing and a stop 15 mounted upon the lower end of the bolt. A sleeve 16 may be fitted upon the bolt within the springs, if desired, so as to support the springs against lateral distortion, and such sleeve should play freely through the flanges 10. It will be readily understood that the springs suspend the casing from the truck frame in such manner that the shocks delivered upon the frame by heavy boxes or other loads will not affect the power plant so as to disconnect any of the gearing or otherwise render any of the parts inoperative.

Within the casing is mounted a motor 17 which is preferably an internal combustion engine having cooling ribs or flanges 18 around its cylinder and having a crank case 19 extending forwardly from its cylinder, the said crank case being formed integral with or rigidly secured to a gear case 20 which is firmly secured to the top plate of the upper member of the casing. A fuel tank 21 is disposed within the casing 9 adjacent the upper or rear end of the same and a pipe 22 equipped with a stop-cock 23 leads from the said tank to a carbureter 24. From the carbureter a pipe 25 leads to the cylinder of the motor 17 and in the said pipe is fitted a governor or regulator 26 which serves to control the flow of fuel to the cylinder so that the speed of the engine will be constant.
The parts just enumerated may severally be of any well-known or preferred form and may be arranged relative to each otherwise than as specifically illustrated, the arrangement shown, however, being advantageous in that it balances the plant as a unit and brings the several parts into very compact form. By referring particularly to Figs. 3 and 4, it will be noted that the carbureter is disposed at an angle to the longitudinal plane of the motor so that it will be vertical when the truck is raised to the normal working position. The exhaust pipe 27 leads from the engine to a muffler 28 and from the muffler a discharge pipe 29 leads through the lower or rear section of the casing 9. A baffle plate 30 is secured over the discharge terminal of this pipe 29 so as to protect the operator or merchandise which may be in the neighborhood of the truck from contact with the heated gases or flame which may possibly escape from the engine without being quenched during the passage through the muffler. If desired, the usual gauze screen may be fitted in the end of the pipe 29 to further counteract the possible escape of the flame. To protect the fuel tank 21 from the heat which is generated in the engine and is present around the same and the parts adjacent thereto, we provide a partition 31 which extends across the casing in advance of the tank and in rear of the muffler, the carbureter, the governor, and the engine, as shown most clearly in Fig. 3. This partition 31 is covered on its front face with asbestos or other heat-resisting material, indicated at 32.

The crank case 19 opens directly into the gear case 20, all these parts being constructed in upper and lower members so that by removing the lower members the entire plant may be exposed and access had thereto for cleaning, repairing, or other purposes. The magneto 33 and the magneto gear case 34 are supported upon the side of the gear case 20 and any desired operative connections may be installed between the engine and the magneto gear as to properly drive the same. The magneto is connected with the spark plug 35 of the engine by an electrical cable 36 and a grounded return in the well-known manner. In order that the ignition may be cut out whenever desired, and the engine therefore brought to a stop, we interpose in the cable 36 a switch 37 whereby the circuit may be opened and closed at the will of the operator and will be preferably located near or on one of the handle members 5 of the truck. The switch may be of any well known form and is illustrated in a conventional manner in Fig. 3. The end of the crank shaft 38 passes into the gear case 20 from the crank case 19 and is mounted in the bracket or partition 39 provided within the gear case. The exact form of the bearing for the end of the crank shaft may be varied at will to suit the user but we prefer annular ball bearings, as indicated at 40. Near its extremity the crank shaft carries a beveled gear wheel 41 which is in constant mesh with the beveled gear wheels 42 opposed to each other and fitting around the transmission shaft 43. The gear case 20 is disposed in an inclined position, as shown clearly in Figs. 4 and 5, and the lower or rear end of the shaft 43 is provided with radial pins or lugs 44 which are adapted to be engaged by a cam head 45 on the front end of a starting shaft 46 which is mounted in brackets depending from the top of the casing 9 and equipped at its outer end with a crank or other handle 47. A spring 48 is coiled around the starting shaft between a stop 49 thereon and the bracket 50 by which the inner or forward end of the shaft is supported so that the shaft is normally held toward the rear or handle end of the truck. A locking collar 51 is secured upon the shaft near its handle end and provided with a lug 52 adapted to engage a recess in a bracket 53 by which the shaft is supported so that when the spring 48 expands and moves the starting shaft to its inoperative position the handle 47 will be held between the planes of the truck frame and the bottom of the case 9 and, consequently, will not be apt to injure the operator nor catch upon the floor of the warehouse or upon the ground and thereby damage any of the working parts.

The beveled gears 42 have their hubs extended outwardly and ball bearings 54 are provided between and adjacent the inner ends of the hubs to permit the shaft 43 to rotate freely and also aid in preventing longitudinal movement of the gears or distortion of the same. A bronze or other wear-resisting sleeve 55 is fitted between the hub of each gear and the shaft and a washer 56 of similar material is fitted around the shaft between the outer end of said sleeve and a collar 57 which is secured to the shaft by a key 58. Each key 58 is seated in a longitudinal groove or recess in the shaft so that it will be held against any movement relative to the shaft and the collar 57 is constructed with a notch in its outer face or end which receives the inner end of the key so that movement of the collar in any direction relative to the shaft will be prevented. A clutch casing or shell 59 is mounted upon the hub of each beveled gear wheel 42 and the direction of rotation of the transmission shaft 43 is determined by one or the other of the said clutch casings being engaged by the coacting clutch member. Each clutch casing consists of an intermediate disk-like web or plate 60 having a sleeve or hub 61 which is so proportioned and finished as to have a driving fit with the hub of the adjacent beveled gear wheel 42 so that when the clutch casing has been driven home upon the hub of the gear wheel it will bind tightly thereon and will rotate constantly therewith. At the outer edge of each disk or intermediate web 60 is a flared rim 62 which receives and is adapted to be frictionally engaged by the outer rim 63 of the clutch member 64. If so desired, the outer surface of the rim 63 may be covered with some friction creating material, as indicated at 65, so that a close working engagement with the rim 62 will be readily and effectually established. The upper or rear clutch casing 59 has its outer rim extended to form a sleeve 66 having vanes or blades 67 projecting therefrom and constituting a fan to create a blast of air through the casing from the forward end of the same onto the cooling ribs 18 of the engine cylinder adjacent which it is located, as shown clearly in Fig. 3. The clutch members 64 are slidably mounted upon the transmission shaft 43 and to that end are provided at their centers with hubs 68 engaging the keys 58 and constructed with external annular grooves 69 which may be engaged by shifting arms.

The arms 70 and 71 for shifting the clutch members are secured upon the opposite ends of a shifting rod 72 which is slidably mounted in brackets or bearings provided therefor on the gear case 20. At the longitudinal center of the shifting rod 72, we secure a lug or collar 73 to which is pivoted the inner end of an operating rod 74 which extends to the upper or rear end of the casing 9 and has its rear end pivoted to a beam 75 which is fulcrumed between the top of the casing and a bracket 76 secured thereto. The opposite ends of this beam 75 are pivoted to the forward ends of connecting rods 77 which extend upwardly and rearwardly and have their outer ends pivoted to the controlling levers 78, turn buckles or similar devices 79 being interposed in the length of the rods 77 so that they may be readily adjusted to the dimensions of the truck when applying the power plant thereto. The controlling levers or grips 78 are fulcrumed intermediate their ends between the depending lugs or ears 80 of brackets 81 which fit against the under side of the side bars of the truck frame and have flanges 82 (see Fig. 17) which fit against the outer sides of said side bars and through which securing bolts or similar fastenings are inserted into the side bars to rigidly secure the brackets in place. The shifting arms 70 and 71 are forked at their inner ends, as shown at 83, to engage the annular grooves 69 in the hubs 68 of the clutch members 64 and the shifting arm 71 has its inner forked end bent laterally so that it may pass within the plane of the fan 66, as will be readily understood. Springs 84 are coiled around the shifting rod 72 at opposite sides of the lug 73 and between said lug and stops 85 which may conveniently be the lugs or brackets which provide bearings on the gear case for the shifting rod. These springs balance each other so that if the controlling levers 78 are not grasped by the operator, the collar or lug 73 will be held at a point midway between the stops 85 and, consequently, the clutch members 64 will be both held out of engagement with their respective clutch casings so that no motion will be imparted to the transmission shaft. If the operator should grasp both controlling levers 78 they will, of course, neutralize each other and hold the beam 75 at a right angle to the longitudinal axis of the plant so that the clutches 64 will remain neutral and the truck will not be propelled. This feature of our apparatus is very advantageous in as much as no motion will be transmitted from the motor to propel the truck unless one or the other of the controlling levers 78 is pressed against the adjacent handle member 5 and, consequently, if the operator should lose control of the truck, the gearing will at once automatically move to neutral position and the travel of the same will cease. Moreover, the direction of travel of the truck can be reversed instantly without any change of direction in the motor and the operator will thus be permitted to work a loaded truck back and forth to get out of a crowded corner or difficult situation, as will be readily understood.

Figure 9:
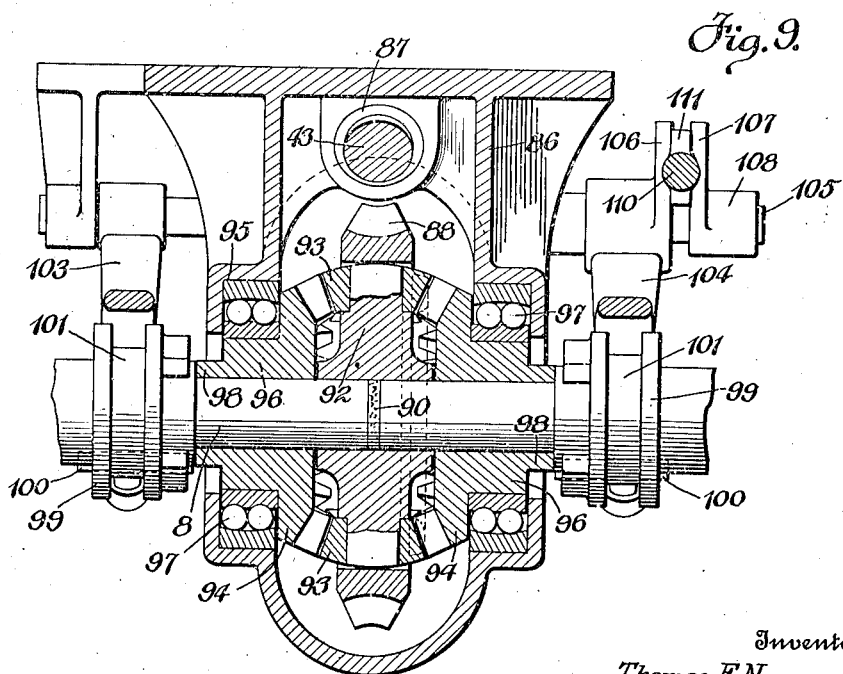
Fig. 9 is a central transverse section through the differential gear.

The transmission shaft 43 projects forwardly and upwardly from the gear case 20 and enters a gear case 86 depending from the extreme forward portion of the upper section of the case 9 and, within the said gear case 86, is equipped with a worm 87 meshing with a worm gear 88 forming the master gear of the differential. Ball bearings 89 are preferably provided to receive the end thrust of the transmission shaft 43 and the master gear 88 of the differential is disposed concentric with the axle 8 which, of course, consists of two alined members, as shown clearly in Fig. 9. A washer 90 of any wear-resisting material is interposed between the ends of the sections of the axle so as to avoid unevenness in the wear of the same. A spider 91 is securely fastened to the side of the worm gear 88 and this spider carries trunnions 92 upon which are journaled the beveled pinions 93, these pinions meshing with opposed beveled gears 94 fitted loosely upon the respective sections of the axle 8. The gear casing 86 is so shaped as to provide recesses 95 to accommodate the hubs 96 of the beveled gears 94 and annular ball bearings 97 are fitted within the said recesses and around the hubs so as to minimize friction. The hubs 96 are constructed with notched outer ends 98 and upon the axle at the outer sides of and adjacent the respective hubs are slidable clutch collars 99 which are adapted to lockingly engage the notched extensions 98 of the hubs 96 and thereby firmly connect the respective gear wheels 94 with the axle. These clutch collars are mounted upon the axle sections by keys 100 and are constructed with external annular grooves 101 whereby they may be engaged by the forked ends 102 of the shifting arms 103 and 104. The shifting arm 103 is secured to a rod 105 which is slidably supported in suitable guides upon the gear case 86 and the top plate of the casing 9 while the shifting arm 104 is fitted upon the said rod 105 but is slidable relative thereto. The arm 104 is constructed with an upstanding lug or projection 106 and a similar projection or lug 107 is formed upon the collar 108 which is secured upon the rod 105 adjacent the arm 104. A spring 109 has its ends secured to the arm 104 and the said collar 108 so as to tend to hold the said members together while a rock shaft 110 is mounted in suitable bearings on the under side of the casing 9 and has a flat-sided head 111 at its forward end fitting between and engaging the inner opposed faces of projections 106 and 107, as shown most clearly in Figs. 3 and 9. It will be readily understood that when the shaft 110 is turned so that the greater dimension of the head 111 extends parallel with the inner faces of the projections 106 and 107, the said projections are brought close together by the spring 109 and the clutch members 99 will be withdrawn from engagement with the respectively adjacent gear wheels, as shown in Fig. 9, so that no motion will be imparted to the axle from the engine. If, however, the rock shaft 110 be turned so that the longer dimension of the head 111 is at right angles to the inner parallel faces of the projections 106 and 107, the collar 108 and the arm 104 will be spread apart against the tension of the spring 109, and, consequently, the clutch members 99 will be thrown into engagement with the hubs of the respectively adjacent gear wheels and the power of the motor will then be applied to the axle. The rear end of the rock shaft 110 is equipped with a handle or button 112 and extends through a bracket 113 secured to the front end of the case 9. This button 112 has its body portion provided with a convex edge 114 and with flat sides 115 while the bracket 113 is provided with an opening 116 having two flat faces 117 connected by a short concave surface where they tend to meet and by a large concave surface 118 at their distal points. The flat sides of the body of the turn buckle or handle coacting with the flat walls of the opening in the bracket 113 will not only serve to limit the movement of the rock shaft to one quarter of a turn but will also coact with the spring 109 in holding the parts in the position in which they may be set.

In fitting the wheels and axle to the truck, we secure to the side bars of the truck the head blocks 119 which consist each of a body having a transverse web 120 to fit against the under side of the side bar of the truck and an upstanding longitudinal flange 121 which is adapted to fit against the outer face of the side bar and is constructed with suitable holes to receive securing bolts whereby it is secured to the side bar. A notch or recess 122 is provided at the center of the upstanding flange or branch 121 and an eye 123 is formed at the inner side of the said recess and the web 120. The axle is carried in hanger blocks 124 which consist each of a central cylindrical body 125 having its inner end partly closed by a web 126, the central opening 127 through the said web being of such diameter as to receive the axle without binding thereon and without leaving such a space as will permit excessive accumulation of dust and dirt. The interior of the cylindrical body 125 provides a chamber in which ball bearings 128 may be fitted around the shaft and the outer end of said chamber will be closed by a filler 129. Extending forwardly and rearwardly from the outer wall of the cylinder 125 are radial lugs 130 which are bolted to the under sides of the side flanges of the upper casing member 12 and at the inner side of the block is a vertical flange 131 which is provided at the center of its upper edge with an internally threaded eye 132 disposed in axial alinement with an eye 133 formed on the upper side of the body 125. The eyes 132 and 133 receive the eye 123 between them and a fastening screw 134 is inserted through the alined eyes, as shown in Fig. 10, to pivotally connect the pillar block to the hanger or head block 119 and thereby pivotally mount the entire plant upon the truck.

While the supporting legs 6 now ordinarily employed upon stevedores' trucks need not be discarded when our invention is applied to the truck, it is advantageous to substitute for said supports adjustable legs or supports by the use of which the rear or handle end of the truck may be held at any desired height. To attain this result, we have devised the construction illustrated in Figs. 12 to 16 in which is illustrated a housing comprising side plates 135 which extend upwardly against opposite faces of the side bars of the truck and are rigidly secured thereto by bolts or screws inserted transversely through the parts. The lower portions of these side plates are of the general form illustrated and are extended rearwardly and downwardly, as shown at 136. Perforated lugs or ears 137 are provided on the lower edges of the side plates and clamping bolts 138 are inserted through the said lugs. The clamping bolt may extend across the entire width of the truck so as to serve as a brace and a spacing bar to maintain the housings in their proper position and such construction has been indicated in Fig. 16. Between the rear edges of the sides plates, we provide a bracket or spacing plate 139 having a shelf 140 projecting rearwardly from its upper edge and this spacing plate and shelf fit against the under side of the side bar of the truck so as to serve as a gage in assembling the parts and also serve as a guard to prevent an accumulation of dirt and dust between the side plates, as well as to prevent the hand or fingers of the operator being caught between the side bar housing and the adjustable leg. The controlling rods 77 will pass at the inner sides of the said housings so that they will not interfere in any way with the use of the same or adjustment of the supporting legs. The supporting legs 141 each consist of a pair of arcuate side plates 142 which are spaced apart and held in the proper spaced relation by connecting plates 143 disposed between the side plates and rigidly secured thereto. The convex side of the leg is constructed with teeth or lugs 144 which are adapted to be engaged by pawls 145 pivotally mounted upon the extension 136 of the respective housings so that the legs will be held in any position in which they may be set. Each pawl 145 is disposed between perforated lugs 147 formed on the upper edges of the said extension 136 and is secured upon a rod 146 journaled in the said lugs or ears. The rod 146 extends across the width of the truck and has its ends journaled in the lugs on both housings, while at an intermediate point of the length of said rod is a lever or handle member 148 by which the rod and the pawls may be rocked when adjusting the lugs. A spring 149 coiled around the rod 146 and having its ends secured, respectively, to the rod and one of the ears 147 holds the pawl normally toward the extension 136 so that when it is in engagement with the supporting leg it will hold said leg positively and efficiently in the position to which it may be adjusted. At the lower ends of the side plates 141, on the concave edges of the same, are perforated lugs or ears 150 through which and a projection 151 on a swivel block 152, a securing bolt 153 is inserted to secure said block in the lower end of the leg. This block is provided at the side opposite the lug 151 with flanges 154 through which and the forward edges of the side plates 142 bolts or rivets may be passed to secure the block in place. The block 152 is provided with an annular plate 155 at its lower end and the central portion of the block forms a sleeve or hub 156 which receives the stem or pintle 157 rising from the head 158 of a fork 159. A roller or caster wheel 160 is journaled in the lower rear end of the fork 159 and a fastening pin or similar device 161 is inserted through the upper end of the stem or pintle 157 above the hub 156 so as to prevent withdrawal of the stem from the hub. It will be readily understood that the fork, with its pintle, is assembled with the block. The block is then inserted in the lower end of the supporting leg and the parts are all secured, a swiveled or caster wheel being thereby furnished at the lower end of the supporting leg so that the wheel will oscillate freely from side to side and thereby follow the course of travel of the truck. The clamping bolt 153 may extend across the width of the truck and serve to connect the legs so as to hold them in their proper spaced relation and prevent spreading thereof but such length of the bolt is not essential and in Fig. 14 we have shown the bolt as being only long enough to secure the swiveled block in the end of one leg. When the legs are arranged as shown in Fig. 12, the short clamping bolts will be used inasmuch as a long rod would be in the way of the operator and interfere with his walking. It is obvious that the supporting legs may be adjusted to support the rear or handle end of the truck at any desired height and to accommodate the clamping bolts 153 when the truck is adjusted to its extreme low position, the lower ends of the extension 136 are reduced and shaped to provide shoulders 162 which receive the clamping bolt 153 and thereby act as stops to limit the lowering of the truck. A clip or tie plate 164 connects the lower forward corners of the plates 135 to prevent spreading of the housing and in the bottom of the housing is a longitudinal slot 165 which receives a stop lug 166 on the under side of the leg at the front end of the same. By engaging the rear end of the slot, the lug 166 prevents the leg dropping from the housing when the truck is raised to an extreme height. It is to be understood that the legs and the housing for the upper ends thereof may be reversed so that the legs will extend forwardly and downwardly from the handle sections of the truck instead of rearwardly and downwardly, as illustrated.

It is thought the use and advantages of our device will be readily understood from the foregoing description, taken in connection with the accompanying drawings. The power plant herein disclosed may be applied to any truck now in use, the only changes involved in the truck being the removal of the present axle and the substitution therefor of the axle with the pillar and head block mountings herein shown and described; the boring of an opening to receive the retaining bolt or pin of the shock absorber and the boring of holes to receive the brackets 81 by which the controlling levers or rods are pivotally supported. The operating mechanism with the motor and the intermediate connections are all inclosed within the casing 9 so that the entire plant may be delivered intact ready for application to a truck. The several parts of the power plant or unit are so disposed that they will operate properly and efficiently at any angle which the truck may assume in operation. Inasmuch as the transmission shaft is connected with the axle by worm gearing, the rotation of the axle will cease at once when power from the motor is cut off. The shifting rods 72 and 74 will normally hold the clutch 64 in the inoperative position or neutral, so that, even if the engine be running, no power will be applied to the transmission shaft and, consequently, no travel imparted to the truck. When the operator takes hold of the handles 5 his fingers are naturally in a position to grip the controlling levers 78 and if the right hand lever be pressed against the adjacent handle 5, the forward clutch member will be thrown into engagement with the adjacent clutch casing and the truck driven forward. If the right hand controlling lever be released and the left hand lever pressed against the adjacent handle member, the truck will be driven backward. Should the truck, for any reason, get beyond the control of the operator the controlling levers 78 will be automatically or instinctively released and, consequently, the truck will come to a stop. By the use of our invention, the operator is relieved of the labor of propelling the truck and is called upon merely to steer the same, and if a gang of stevedores be working, all will be compelled to work at the same speed inasmuch as the motor is adjusted to a set speed and the stevedores will, therefore, have a fixed rate of travel. It may sometimes be desirable to propel the truck by hand as, for instance, when it is unloaded and is to be brought in position to take up a box or bale.
The rock shaft 110 may then be manipulated so as to release the axle from its operative engagement with the differential gearing and the axle will then rotate freely in the hubs 96 and the clutch collars 99 as bearings while the engine may remain at rest. Having brought the truck into such a position that the chisel 4 may be inserted under the box or bale, the engine may be started and the axle thrown into mesh with the differential gear whereupon the power of the engine may be utilized to drive the chisel 4 under the box or bale so as to take up the same. This facility of operating the truck manually will be found advantageous in the event that the engine for any reason becomes dead or sustains an injury which renders it temporarily inoperative and also when it is desired to economize on fuel. When the engine is running, a constant current of air will be drawn in through the front end of the casing and delivered over the engine cylinder to escape through the openings 163 in the side of the casing immediately adjacent the cylinder. It will be noted, furthermore, that said opening 163 is immediately adjacent the rear end of the engine and that the partition 31 is also in juxtaposition to the engine so that the partition serves as a deflector to direct the air currents toward the opening. Consequently, the air currents will not merely flow through the length of the casing and escape from the rear end thereof, but will be directed onto and around the engine, serving effectually to cool the engine.
The power plant will operate effectually at whatever angle the truck may be disposed and by arranging the transmission obliquely relative to the horizontal plane of the casing the plant is brought into very compact form, the use of the worm gear is permitted, and weight of the plant brought close to the axle and the operator relieved of the same.

Having thus described the invention, what is claimed as new is:

1. The combination with a stevedore's truck, of a casing hung upon the rear side of the truck, a power plant contained within said casing, operative connections between said power plant and the axle of the truck, and means to be mounted upon the truck for controlling said power plant, the casing, the power plant and connections constituting a unit for application to the truck.

2. The combination with a stevedore's truck, of a casing secured to the rear side thereof and comprising upper and lower sections, and a power plant disposed within the casing and carried by the top plate of the same and arranged to rotate the axle upon the truck.

3. A power plant for stevedores' trucks comprising a casing adapted to be mounted upon the truck, an internal combustion engine disposed within the casing at one side thereof, gearing disposed longitudinally of the casing, for transmitting the power of the engine to the axle of the truck and including a fan, means at the side of the casing remote from the engine normally holding the gearing in neutral position, means for causing said means to shift the gearing to effect either forward or backward travel of the truck, a fuel tank disposed in rear of the engine, a carbureter connected with the fuel tank, connections between the carbureter and the engine, and a heat-resisting partition extending across the casing in proximity to the engine and separating the tank from the carbureter and the engine.

4. A power plant for stevedores' trucks comprising a casing to be hung on the under side of the truck, an engine mounted within the casing at one side thereof, gearing extending longitudinally of the casing for operatively connecting the engine with the axle of the truck, a muffler connected with the exhaust of the engine and disposed within the casing at the side thereof remote from the engine, a discharge from said muffler leading through the casing, and a baffle plate secured to the exterior of the casing over the end of said discharge.

5. In a stevedore's truck, the combination with the truck frame, of a head block secured thereto and having a recess in its outer side, and a perforated ear at the inner end of said recess, a pillar block comprising a substantially cylindrical body having a web at one end and provided with spaced axially alined ears adapted to fit at opposite sides of the ear on the head block with the outer of said ears fitting in the recess in the head block, a pivot inserted through said alined ears to secure the pillar block to the head block, an axle extending through the cylindrical body and the web at the end of the same, and bearings fitting within the said body around the axle.

6. The combination with a stevedore's truck, of a power plant pivotally connected to the wheeled end of the same and yieldably supported at a point in rear of the wheeled end.

7. The combination with a stevedore's truck, having an axle and wheels on the axle, of a power plant hung on the truck and extending over the axle and including a motor, a transmission shaft geared to the motor and disposed obliquely relative to the horizontal plane of the plant, and gearing connecting the transmission shaft to the axle.

8. The combination with a stevedore's truck, of a power plant pivotally secured to the under side thereof adjacent the forward end of the same, and supporting wheels connected with said plant below and adjacent the point of pivotal suspension of the same.

9. A power plant for stevedores' trucks comprising a casing pivoted at its front end to the truck adjacent the front end thereof, an axle and supporting wheels carried by the front end of the casing, a motor within the casing, a transmission shaft disposed longitudinally within the casing at the side of the motor and extending obliquely relative to the top and bottom of the casing, gearing connecting the transmission shaft with the motor, gearing connecting the transmission shaft with the axle, a fuel tank, and a carbureter connected with the motor and with the fuel tank and disposed obliquely with respect to the casing.

10. A power plant for stevedores' trucks comprising a casing pivoted at the front end thereof, an axle and supporting wheels carried by the front end of the casing, yieldable means for suspending the rear end of the casing, a motor within the casing, and means operatively connecting the motor with the axle.

In testimony whereof we affix our signatures.

THOMAS F. NEWMAN. [L. S.]
OLIVER W. JOHNSON. [L. S.]